United States Patent [19]

Volk

[11] Patent Number: 5,388,265
[45] Date of Patent: Feb. 7, 1995

[54] METHOD AND APPARATUS FOR PLACING AN INTEGRATED CIRCUIT CHIP IN A REDUCED POWER CONSUMPTION STATE

[75] Inventor: Andrew M. Volk, Loomis, Calif.

[73] Assignee: Intel Corporation, Santa Clara, Calif.

[21] Appl. No.: 53,296

[22] Filed: Apr. 26, 1993

Related U.S. Application Data

[63] Continuation of Ser. No. 848,416, Mar. 6, 1992, abandoned.

[51] Int. Cl.⁶ ............................................. G06F 9/00
[52] U.S. Cl. ........................................ 395/750; 364/707; 364/273; 364/273.1; 364/232.8; 364/DIG. 1; 371/16.3; 371/66
[58] Field of Search ............... 395/750, 425, 775, 800; 364/707; 371/16.3, 66

[56] References Cited

U.S. PATENT DOCUMENTS

| | | | |
|---|---|---|---|
| 4,203,153 | 5/1980 | Boyd | 395/750 |
| 4,365,290 | 12/1982 | Nelms et al. | 395/750 |
| 4,479,191 | 10/1984 | Nojima et al. | |
| 4,639,864 | 1/1987 | Katzman et al. | 395/750 |
| 4,667,289 | 5/1987 | Yoshida et al. | 395/750 |
| 4,698,748 | 10/1987 | Juzswik et al. | 395/750 |
| 4,766,567 | 8/1988 | Kato | 395/750 |
| 4,780,843 | 10/1988 | Tietjen | 364/707 |
| 4,823,292 | 4/1989 | Hillion | 364/707 |
| 4,841,440 | 6/1989 | Yonezu et al. | |
| 4,881,205 | 11/1989 | Aihara | 364/707 |
| 4,896,260 | 1/1990 | Hyatt | 395/775 |
| 4,907,183 | 3/1990 | Tanaka | 364/707 |
| 4,922,450 | 5/1990 | Rose et al. | 395/750 |
| 4,935,863 | 6/1990 | Galvas et al. | 395/750 |
| 4,980,836 | 12/1990 | Carter et al. | 364/200 |
| 4,991,129 | 2/1991 | Swartz | 364/707 |
| 5,021,679 | 6/1991 | Fairbanks et al. | 364/707 |
| 5,025,387 | 6/1991 | Frane | 395/750 |
| 5,083,266 | 1/1992 | Watanabe | |
| 5,123,107 | 6/1992 | Mensch, Jr. | 395/800 |
| 5,129,091 | 7/1992 | Yorimoto et al. | 395/750 |
| 5,151,992 | 9/1992 | Nagae | 395/750 |
| 5,167,024 | 11/1992 | Smith et al. | 395/375 |
| 5,175,845 | 12/1992 | Little | 395/750 |
| 5,220,672 | 6/1993 | Nakao et al. | 395/750 |
| 5,239,652 | 8/1993 | Seibert et al. | 395/750 |
| 5,249,298 | 9/1993 | Bolan et al. | 395/750 |
| 5,251,320 | 10/1993 | Kuzawinski et al. | 395/750 |

FOREIGN PATENT DOCUMENTS

| | | |
|---|---|---|
| 0103755A2 | 8/1983 | European Pat. Off. |
| 0140814 | 10/1984 | European Pat. Off. |
| 0349762A2 | 6/1989 | European Pat. Off. |
| 0366250 | 9/1989 | European Pat. Off. |
| 0368144 | 11/1989 | European Pat. Off. |
| 0419908 | 9/1990 | European Pat. Off. |
| 0451661 | 3/1991 | European Pat. Off. |
| 2010551 | 11/1978 | United Kingdom |
| 2130765 | 10/1983 | United Kingdom |

OTHER PUBLICATIONS

"Power-on Reset" *Automated Handbook 1988*, published 1988, Intel Corporation, Santa Clara, pp. 10–24 to 10–25.

*Primary Examiner*—Allen R. MacDonald
*Assistant Examiner*—Tariq Hafiz
*Attorney, Agent, or Firm*—Blakely, Sokoloff, Taylor & Zafman

[57] ABSTRACT

A method and apparatus for a chip to monitor its own activity and enter and exit a state of reduced power consumption. The present invention includes defining a predetermined state in which the chip could power down cleanly and monitoring the chip to determine when the chip is in that predetermined state. The present invention also includes a method and apparatus for putting the chip in a state of reduced power consumption state when the chip is in the predetermined state. The present invention also includes a method and apparatus for either turning off the clock generation circuitry or leaving it on during the power down state.

17 Claims, 10 Drawing Sheets

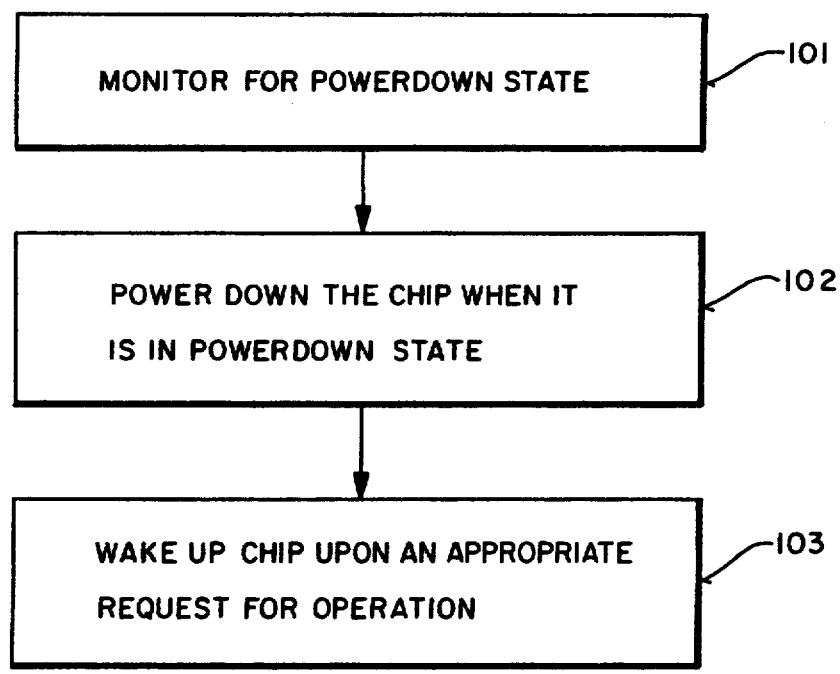
FIG _ 1

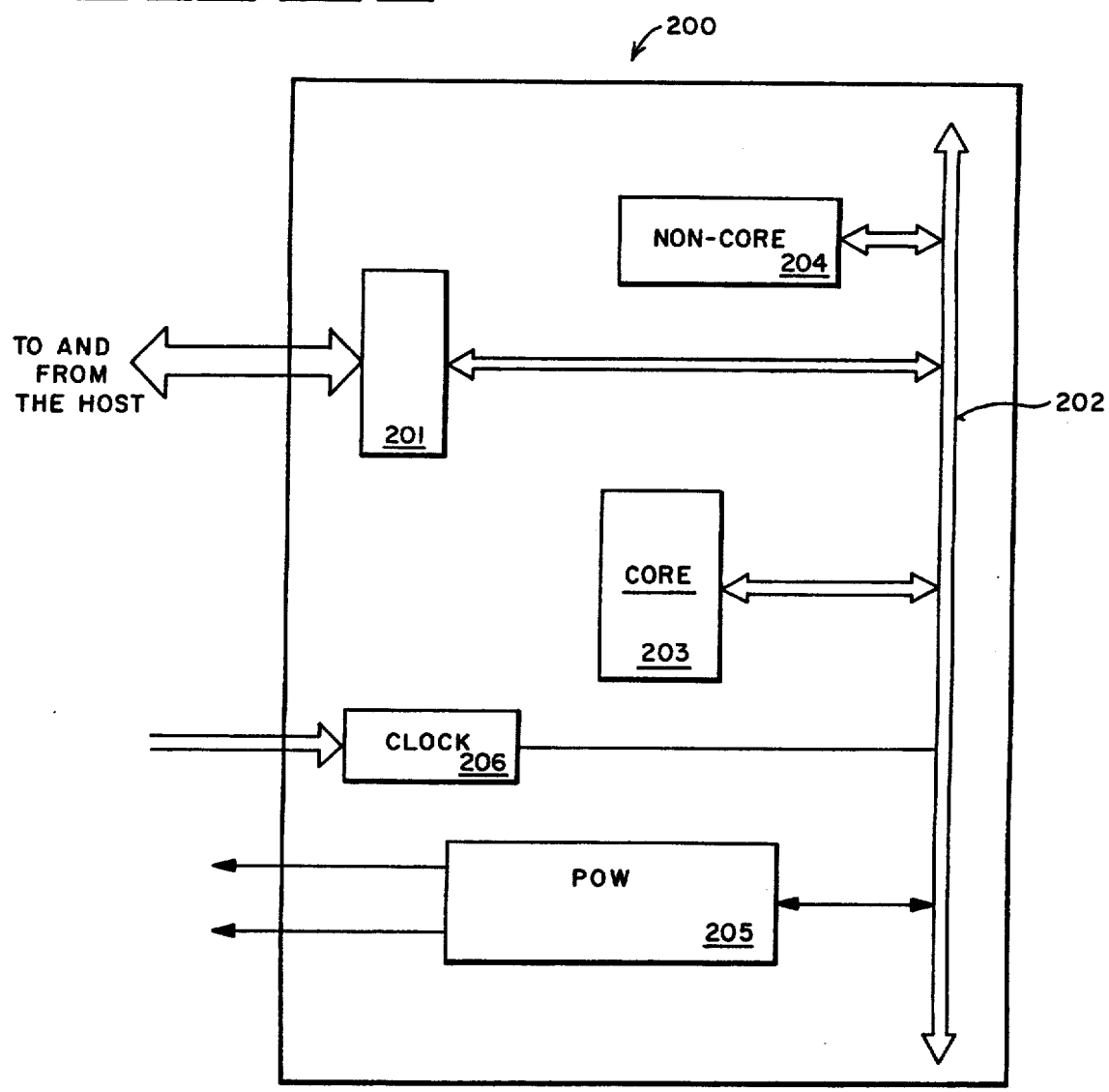

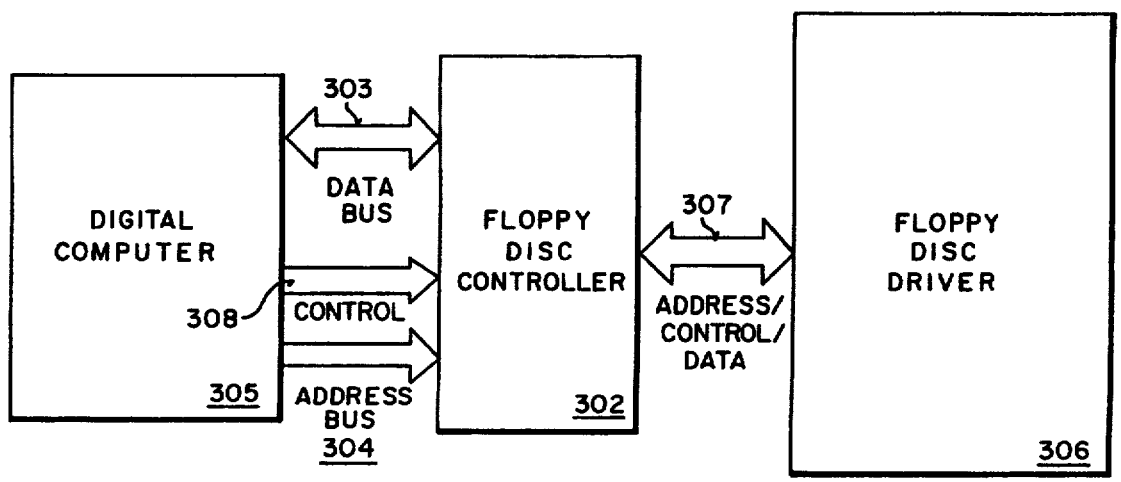
FIG_3

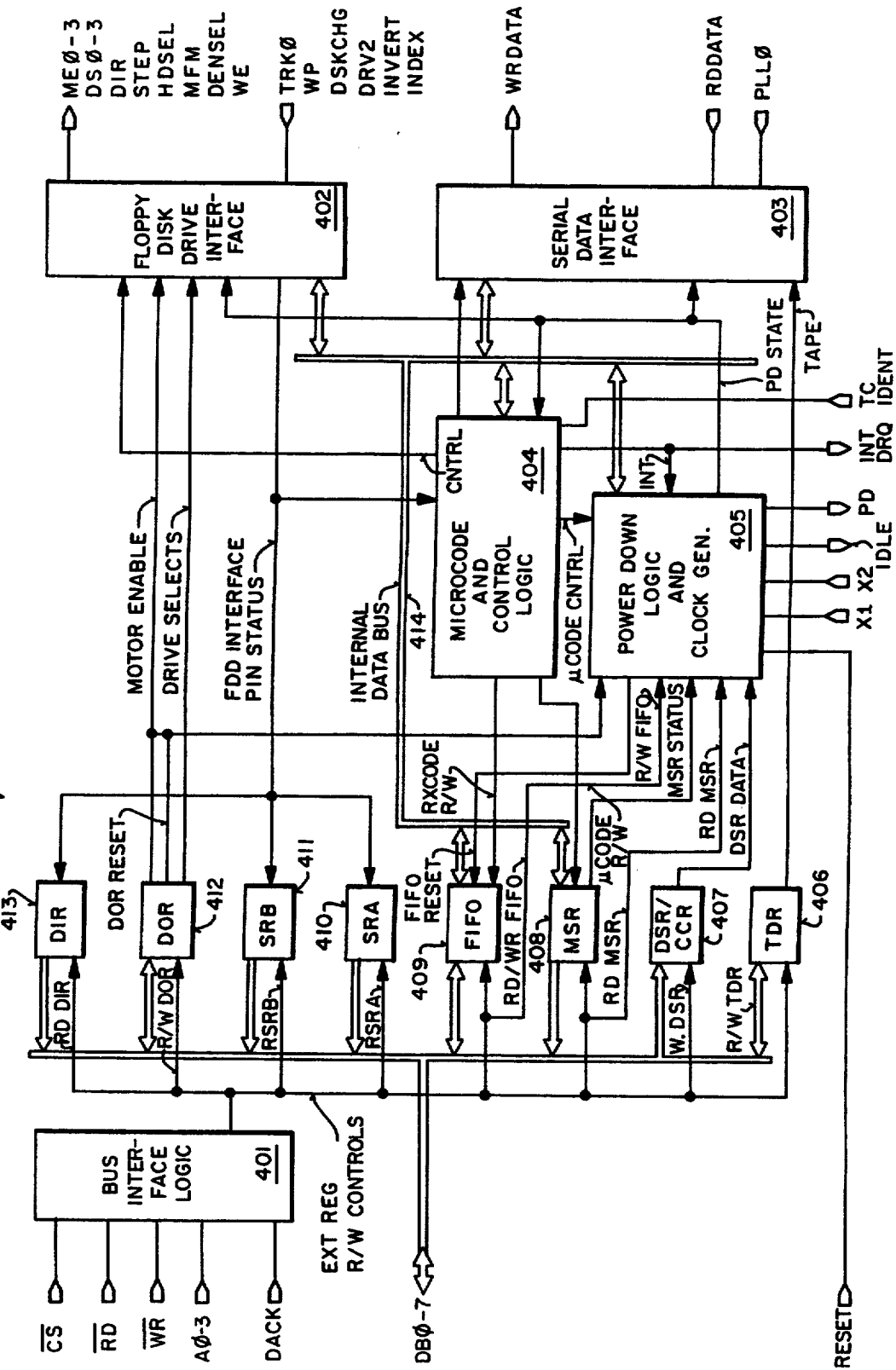

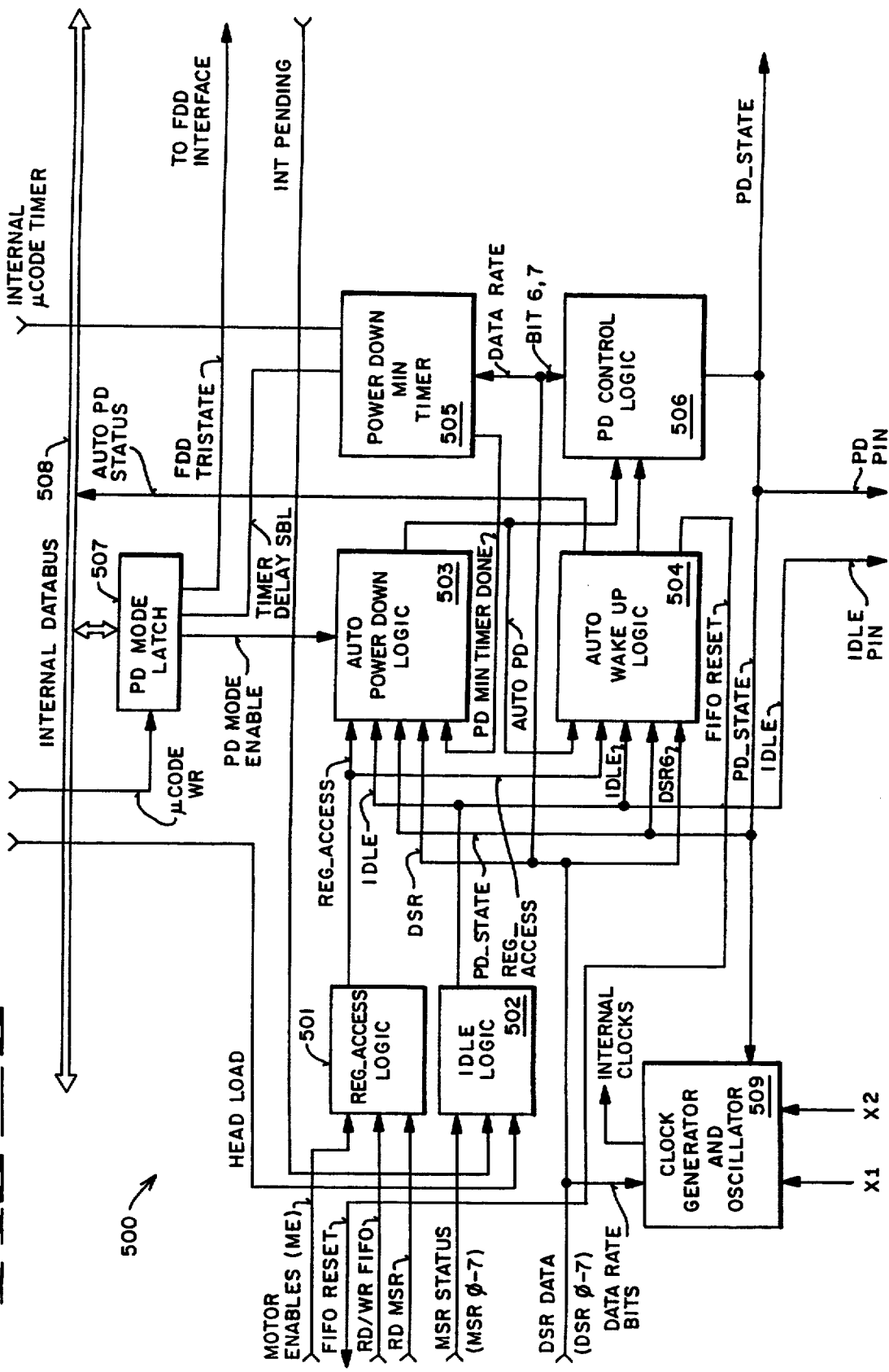

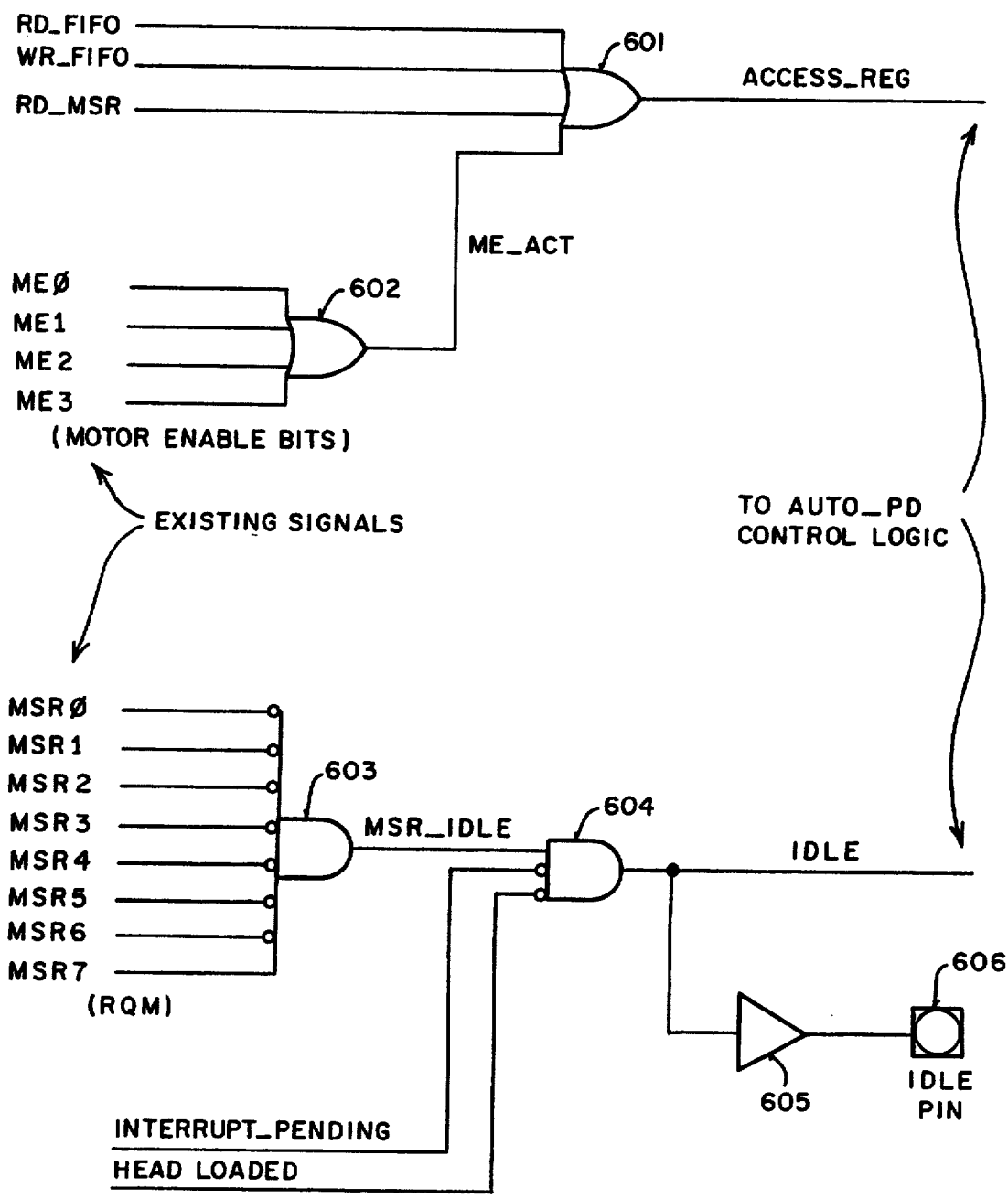

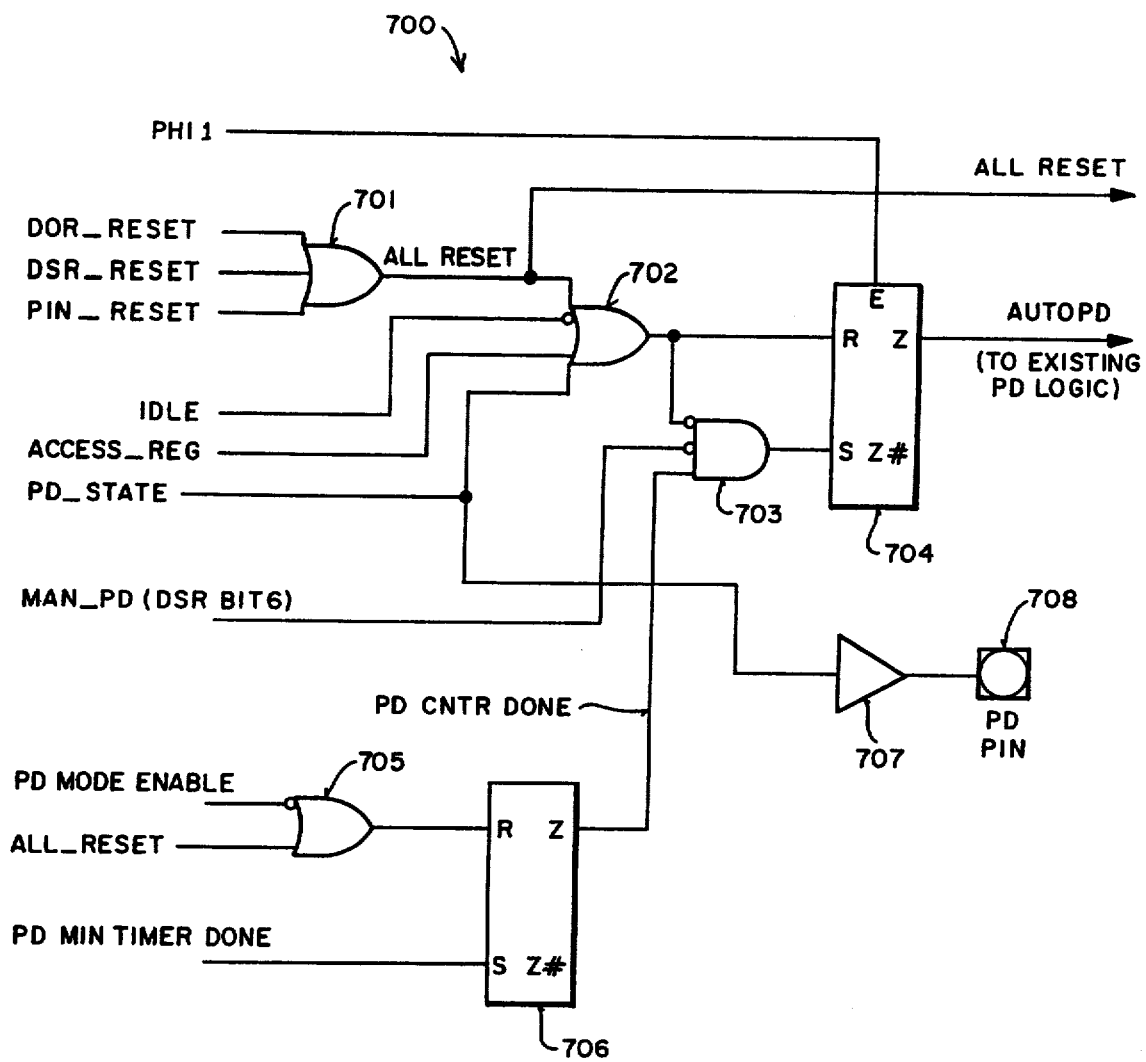
FIG_7

FIG _ 8
SET POWERDOWN MODE COMMAND:
| BITS | OP | 7 | 6 | 5 | 4 | 3 | 2 | 1 | 0 |
|---|---|---|---|---|---|---|---|---|---|
| COMMAND | W | 0 | 0 | 0 | 1 | 0 | 1 | 1 | 1 |
| PARAMETER | W | 0 | 0 | 0 | 0 | 0 | • | MIN DLY | AUTO PD |
| RESULTS PHASE | R | 0 | 0 | 0 | 0 | 0 | • | MIN DLY | AUTO PD |
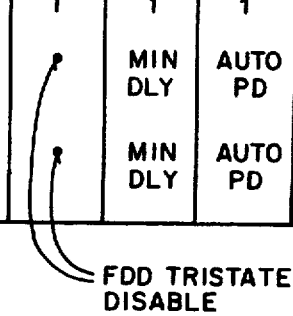
FDD TRISTATE DISABLE
FIG _ 9
DATARATE SELECT REGISTER (DSR)
| BIT | 7 | 6 | 5 | 4 | 3 | 2 | 1 | 0 |
|---|---|---|---|---|---|---|---|---|
| FUNCTION | S/W RST | MAN PD | PD OSC | PRE COMP 2 | PRE COMP 1 | PRE COMP 0 | DR SEL 1 | DR SEL 0 |

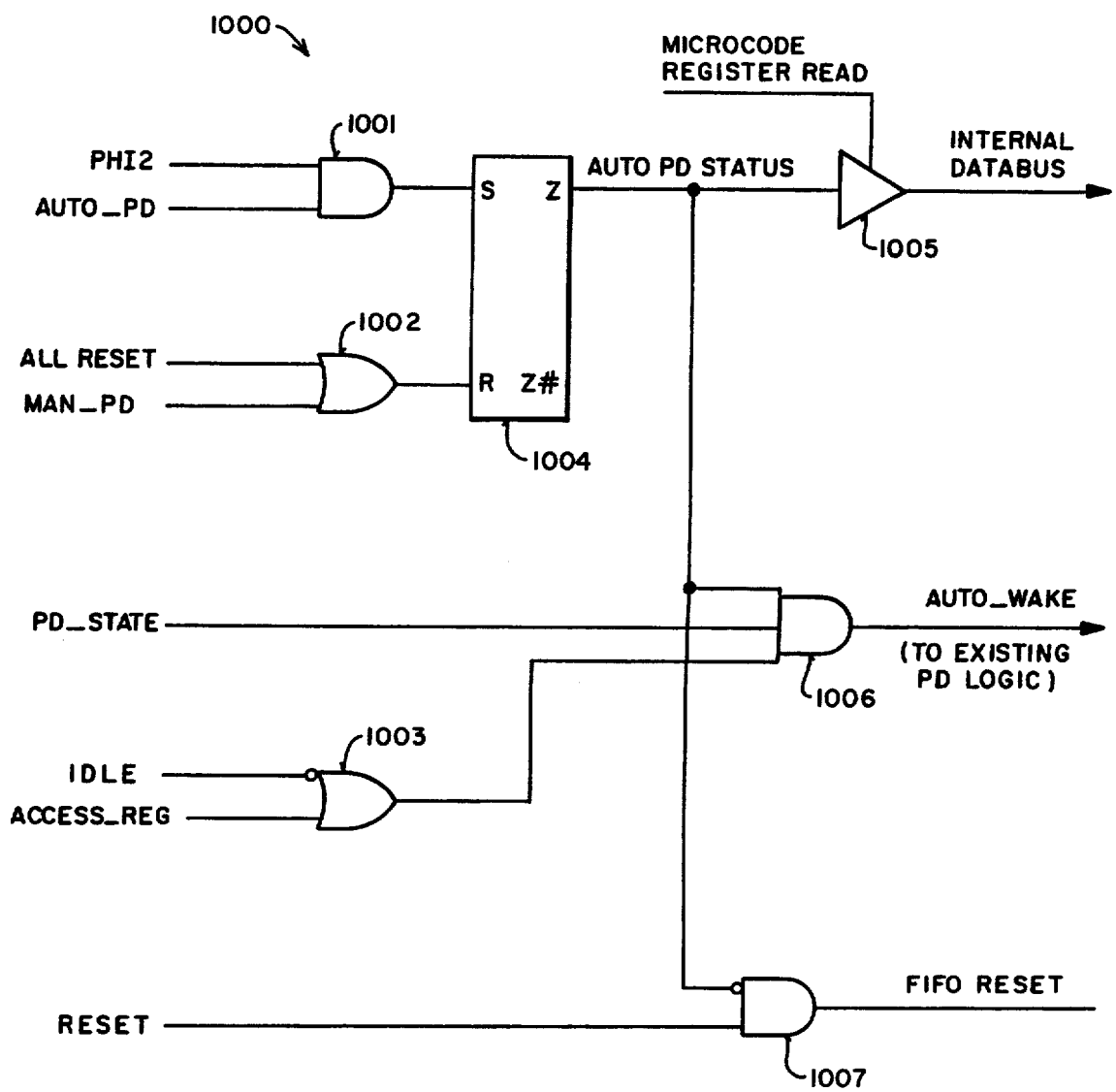

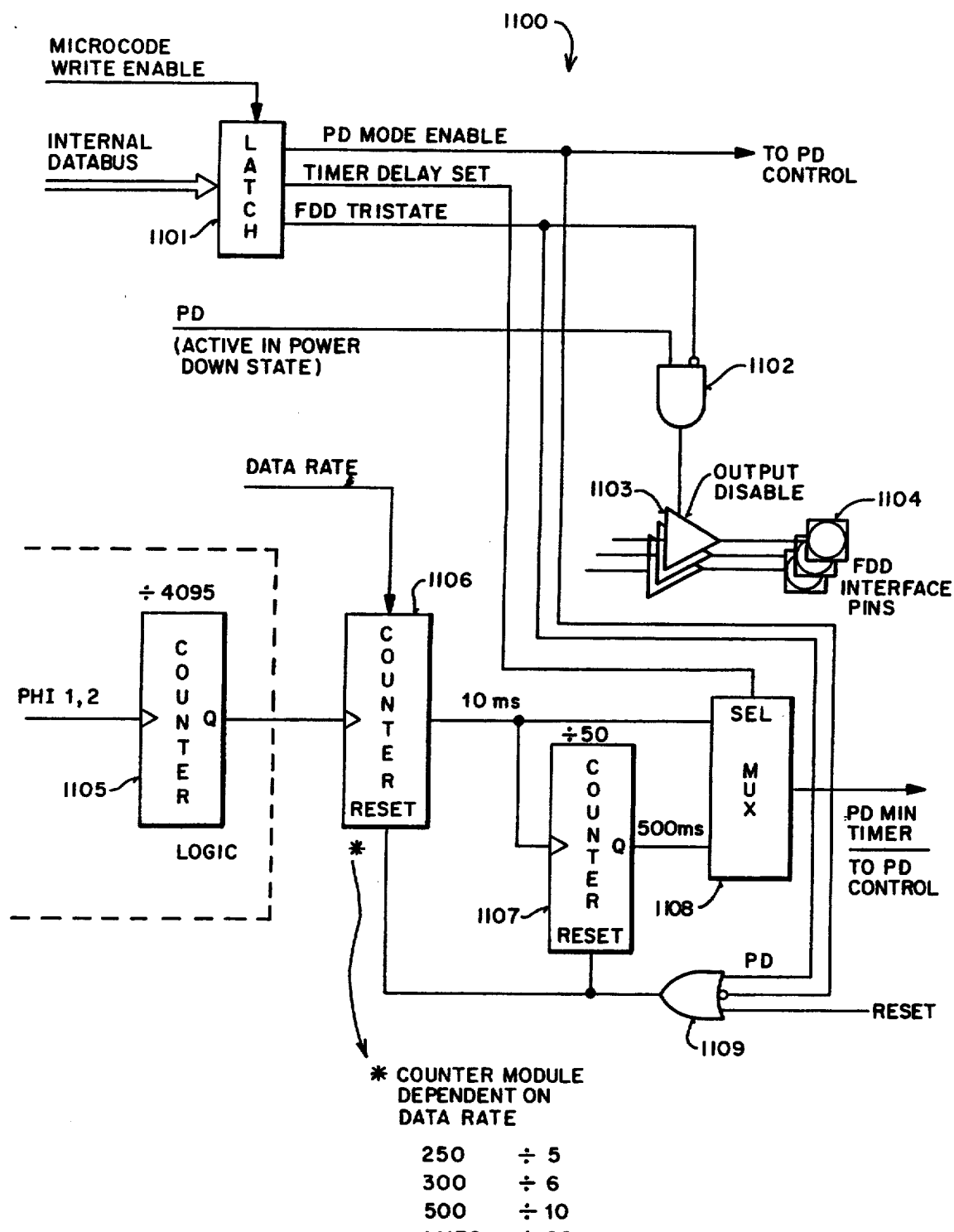
FIG _ 11

METHOD AND APPARATUS FOR PLACING AN INTEGRATED CIRCUIT CHIP IN A REDUCED POWER CONSUMPTION STATE

This is a continuation of application Ser. No. 07/848,416, filed Mar. 6, 1992, now abandoned.

FIELD OF THE INVENTION

The present invention relates generally to the field of power management of integrated circuits; particularly, the present invention relates to the field of power management circuits capable of placing integrated circuits into a state of reduced power consumption.

BACKGROUND OF THE INVENTION

With the emergence of the laptop computer market, there has been a desire for a new Personal Computer (PC) that operates at a very low power. Although recently the PC market has been attempting to move to power supply voltages of 3 volts, instead of the 5 volts, the focus of reducing power consumption has been in the area of when the chip is in a state of little or no activity. Ideally, when a chip is not active currently, it would be beneficial to reduce the power consumption, thereby operating at a lower power than if the chip was constantly drawing power. One method of achieving low power consumption in chips is to employ power management circuits. Power management circuits put the chip into a state that draws little or no current, even though the supply voltage remains coupled to the chip. This state is known as power down. Power management circuits are particularly advantageous to utilize when a chip is not currently active.

One type of prior art power management circuit utilizes external counters to detect activity in the chip. These counters are usually timers keyed to the last access of the chip. These timers act as retriggerable one-shots, such that when no activity occurs for a predetermined period of time, the chip is allowed to power down. One problem with such a power management scheme is that external control (i.e., via the counter) of the power management circuit is required. When the external counters signal that the chip may be put into power down mode, an external switch switches off the power. Hence, actually entering the power down mode is externally controlled. Furthermore, these power management circuits are not transparent to software controlling the chip. Once the power is turned off and the power down state has been entered, all internal status is lost. Upon powering up the chip, all lost status must be restored.

Another problem with prior art power management circuits is that any form of reset, software or hardware (e.g., a pin), usually resets the power down mode. Since the software resets occur in most application software and in the disk operating system (DOS), the power down mode is soon lost and is again dependent on the intervention of basic input/output system (BIOS), DOS or the application software to maintain the mode. Furthermore, resetting a chip results in losing the status. Therefore, resetting initializes the chip to a default state, different from the internal state (i.e., status) of the chip before the reset. Those different status bits must be restored after the reset.

Other prior art power management circuits, such as National Semiconductors PC8477, have a power down mode which requires that the mode be restored when waking the chip back up again. Moreover, prior art power management circuits do not allow the user to program whether on-chip crystal oscillators are on or off when the rest of the chip is powered down. Typically, all prior art power management circuits turn the oscillator off and, thus, have problems with recovery time and start-up when powering up.

Another type of prior art power management circuit, such as those employed by Intel's 82077AA reduces the power to very low levels, but requires the BIOS, DOS or application software to control when the chip is placed in the power down. Further, these power management circuits require considerable software and time to restore the state of the internal machine to its pre-power down condition. Lastly, the crystal oscillator is powered down with the rest of the chip. When the crystal oscillator is powered down, the recovery is not well controlled and the time to recover could be very long.

As will be seen, the present invention provides an apparatus and method for a chip to monitor its own activity and enter and exit the power down state in a manner that is transparent to the software running the chip. Moreover, the present invention allows the oscillator to run making recovery time effectively instantaneous.

SUMMARY OF THE INVENTION

A method and apparatus for a chip to monitor its own activity and enter and exit a state of reduced power consumption. The present invention includes defining a predetermined state in which the chip could power down cleanly and monitoring the chip to determine when the chip is in that predetermined state. The present invention also includes a method and apparatus for putting the chip in a state of reduced power consumption state when the chip is in the predetermined state.

The present invention also includes a method and apparatus for providing an interface to the external system when the chip is in the state of reduced power consumption, such that the chip appears to the external system as if it were powered up. Furthermore, the present invention includes a method and apparatus for powering on the chip on an appropriate request for operation after the chip has been put into the state of reduced power consumption.

The present invention also includes the method and apparatus for either turning off the clock generation circuitry or leaving it on during the power down state.

BRIEF DESCRIPTION OF DRAWINGS

The present invention will be understood more fully from the detailed description given below and from the accompanying drawings of the preferred embodiments of the invention, which, however, should not be taken to limit the invention to this specific embodiment, but are for explanation and understanding only.

FIG. 1 is a flow chart depicting the method of the present invention.

FIG. 2 is a block diagram of the chip of the present invention.

FIG. 3 is a block diagram of the computer system of the present invention.

FIG. 4 is a block diagram of the floppy disk controller of the present invention.

FIG. 5 is a block diagram of the power down logic block of the present invention.

FIGS. 6A and 6B illustrates the access register and IDLE logic of the present invention.

FIG. 7 illustrates the auto power down control logic of the present invention.

FIG. 8 illustrates the currently preferred embodiment of the set power down mode command of the present invention.

FIG. 9 illustrates the currently preferred embodiment of the data rate select register (DSR) of the present invention.

FIG. 10 illustrates the auto wake up logic of the present invention.

FIG. 11 illustrates the power down mode latch and timer logic of the power management circuit of the present invention.

DETAILED DESCRIPTION OF THE INVENTION

A method and apparatus for a chip to monitor its own activity and enter/exit the power down state is described. In the following description, numerous specific details are set forth such as specific pin numbers, signal names, number of bits, number of bytes, etc., in order to provide a thorough understanding of the present invention. It will be obvious, however, to one skilled in the art that the present invention may be practiced without these specific details. In other instances, well-known operations have not been described in detail to avoid unnecessarily obscuring the present invention.

The present invention relates to the field of power management logic circuits which are capable of automatically putting a chip into the power down state. The power down state of the present invention refers to a state of the logic where little or no current is being drawn by the circuits in the chip. Even though the circuits draw little or no current, the supply voltage remains applied to all of the logic and selected circuits are "alive" to monitor external activity to determine when to wake up. Furthermore, the supply voltage sustains certain internal status information so that when the chip does wake up, the chip retains enough information of its state before power down that it proceeds with the new activity without the external system being aware that it was powered down. In this manner, the powering down of the chip is transparent to the external system.

FIG. 1 illustrates the method of the present invention for automatically powering down a chip in a manner that is transparent to the external system (e.g., the software running the chip). Referring to FIG. 1, the method of the present invention includes monitoring the chip to determine when the chip can be powered down. This is shown as block 101, namely monitoring the chip for the power down state. Next, the chip is put into the power down state (block 102), while providing status through the normal applications interface to the external system that makes it appear that the chip is powered up. (Separate status is provided to indicate the powered down mode.) Once in the power down state, the chip monitors its own activity and waits until an appropriate request is made upon the chip. Upon such a request, the chip is once again powered up (block 103) (i.e., the chip "wakes" up).

Monitoring the chip to determine whether it can be powered down comprises two separate operations. First, a state must be defined, such that when the chip is in that state, the chip can be powered down cleanly without interfering with the function of the chip. A chip can power down cleanly if powering down the chip would not result in interfering with the current functioning of the chip or its ability to retain its state. This state is subject to the discretion of the designer of the chip. The state could be defined to be that state during which time there is no activity occurring in conjunction with the chip.

On the other hand, the state may be defined, such that when the chip is not in that state, the chip may be powered down. For example, the state may be defined to be only that activity which is related to the chip's purpose or function, as opposed to activity regarding the status of the chip. For instance, in the case of a floppy disk controller, the activity related to the function of a chip would include the performing of a disk drive access. However, an access to a register on the floppy disk controller chip for the purpose of determining whether the chip is currently performing a serial access read on the disk drive would be considered status. Thus, if a chip is active and that activity relates to the function or purpose of the chip, the chip would not be permitted to power down.

Generally, the power down state for a chip may be the idle state (i.e., the state when the chip is idle). What constitutes the idle state for a chip is both chip and design dependent. Furthermore, the chip does not have to be entirely idle, such that the chip is not being accessed at all. A typical chip is shown in FIG. 2. Referring to FIG. 2, chip 200 comprises interface logic 201 for interfacing chip 200 with other chips. Interface logic 201 is coupled and communicates to the remainder of chip 200 using bus 202. Chip 200 also includes core logic 203 which performs the control functions for chip 200. Core logic 203 can include microcode and control logic necessary for the chip to accomplish its designated function. Included in the control logic of core logic 203 could be execution units, command units, command registers, etc. Chip 200 also includes non-core logic 204 which can be accessed by chip 200 through bus 202. Non-core logic 204 can also be accessed by external chips or circuitry coupled to chip 200 (via the pins). Non-core logic 204 is generally a small part of chip 200. Non-core logic 204 may include the logic necessary to hold the status or state of chip 200 and typically includes registers or other storage components. Non-core logic 204 can also include logic not specifically related to the core logic, such that powering down the non-core logic would not result in an "unclean" power down. Moreover, non-core logic 204 may have to remain "alive" in order for chip 200 to appear awake to the external system; this non-core logic 204, if properly designed, should consume little or no power. Chip 200 also includes power management logic 205 which is responsible for monitoring the activity of chip 200 and placing chip 200 into and out of the power down state. Chip 200 could also include the clock generator logic and/or oscillator 206 utilized for clocking chip 200. Clock logic 206 could be controlled by an external clocking signal. The clock generator logic and/or oscillator 206 could also be included in power management logic 205.

The idle state for a chip, such as chip 200 in FIG. 2, is the state in which the core logic of the chip is not required. Therefore, when a chip is not in the idle state, the use of the core is either imminent or is requested directly. A chip cannot power down cleanly if core related activity exists. On the other hand, the non-core logic which contains the status of the chip and controls the reading of external pins does not interact and contribute to the functioning of the core logic. Thus, the non-core logic does not require the core logic of the chip to be active when it is being accessed or utilized. Therefore, when non-core activity is present, the chip may be powered down.

Referring back to FIG. 1, the power down state can be the state in which no core activity exists. For instance, when a chip is not executing any commands or sequence of commands, power management logic may be able to power down the chip. Therefore, to define the power down state, the minimal set of chip activity in which the core is required or may be accessed must be determined. This is the minimum activity required to keep the chip awake (i.e., out of the power down state).

Once the minimum set of chip activities for which a chip must stay awake has been defined or determined, the power management logic of the present invention monitors the chip to determine if these activities are occurring (e.g., core related activity exists). Monitoring the activity of the chip can take a variety of forms. Using simple logic, the power management logic can access command and control registers which indicate chip activity according to specific bit designations (e.g., a logical 1 or 0) or specific bit patterns. The power management logic can also monitor specific signals which indicate chip activity by whether they are in a specific logical state (e.g., high, low, etc.). The output of the logic controls whether the chip is put into the power down state. If the output of the logic indicates that there currently is chip activity, then the power management logic does not put the chip into power down. On the other hand, if the output of the logic indicates that no chip activity exists, then the power management logic puts the chip into the power down state.

Once the chip is powered down, the chip provides an interface to the external system in which the chip operates. Typically, this is a computer system. The interface allows the chip to appear ready to receive commands from the external system even though the chip is in power down mode. For some chips, appearing ready to receive commands means that a register or storage location on the chip contains a value (i.e., bit or byte designation) which is accessed by the external system. Upon accessing the register or storage location, the external system determines that the chip is ready to receive commands. Appearing ready to receive commands could also be indicated by a signal being high or low and indicating the same to the external system. Therefore, for a chip to appear ready to receive commands, any signal or register values that would indicate a readiness on the part of the chip to the external system must be the same. (This does not preclude having a special signal or status to indicate the chip is powered down.)

Moreover, the interface permits access to the non-core logic without having the chip leave the powered down state. Thus, the interface allows the chip to accept input into any register and any data which is written to the chip is retained and reflected in the operation when the chip wakes up. Furthermore, all system interface registers can still be read. It should be noted that during power down, no status is lost or changed. Therefore, when the registers are read they will contain the value they had before the power down state was entered, with the exception of any status values changed by the external system during power down and any pin status values purposefully changed by the chip itself.

Furthermore, system interface pins on the chip are left active to monitor system accesses that may wake up the chip. Thus, to the external system, the chip looks alive and ready to receive commands while in power down.

During the power down state, the present invention allows the internal oscillator to be programmed to be either powered down or active, independent of whether the chip is powered down. If a crystal oscillator is on the chip, the oscillator remains powered up, while the rest of the chip is powered down. This allows the chip to wake up quickly because the chip does not have to wait for the crystal oscillator to stabilize upon starting up.

A typical application that uses the crystal oscillator works as follows: the oscillator would be programmed to be powered up at all times and the chip is programmed for automatic power down (i.e., powering down when there is no activity). When the chip powers itself down, the oscillator continues running, consuming approximately 2 mA. When the chip wakes up, recovery time is minimal. If the system goes into a power saving standby mode (by user request or system time out), then the external system power management logic shuts off the crystal oscillator to save all possible power. In this case, the user or system assumes power management control and transparency to the applications software is no longer required. Recovery from this state requires the software to turn on the oscillator sufficiently ahead of waking up the chip to allow the crystal to recover. Whether the internal oscillator is programmed to be either powered down or active is controlled from logic (e.g., a signal) in the power management circuitry. If a chip is clocked by an external oscillator, any internal crystal oscillator circuitry can be turned off to save power. Recovery time of the chip, in this case, is dependent on the characteristics of the external source. If the external source remains active during the time the chip is powered down, then the recovery time is minimized.

The chip is powered up (i.e., wakes up) from the powered down state on an appropriate request for operation from the external system (block 103 in FIG. 1). The chip could also be powered up in response to a reset signal. To wake up, the request must be directed to the core or to core activity.

Some external systems, such as floppy drive support systems and other application programs, are very sensitive to any delays in writing the first byte of a command and have a very short time out during this period. Thus, upon powering up the chip, a chip that is not ready and enabled to receive commands at any time during power down would not be tolerated by these programs. However, all programs must be tolerant of a delay after the first command byte is issued. This delay is generally due to the microcode in a chip verifying status of the chip and its connections. The external software must be tolerant of this delay. Current BIOS codes provide two second time outs to compensate for this delay. This tolerance for a delay provides an excellent window to hide the recovery time period.

Also upon powering up, the oscillator must be turned on if it was turned off by the power management logic. Recovery from the off state is slow and subject to "drop out". Both of these problems can be hidden during the recovery time.

In the currently preferred embodiment, once awake, the chip stays powered up for a predetermined time interval. If no command is executed during this time period, then the chip goes back into power down mode. If, however, a command was executed or is in the process of being executed, then the chip remains awake. The length of the time period is set by the user according to the time the application software, DOS or BIOS needs after reset or after the chip powers up to allow the application software, DOS or BIOS to begin execution of any command that was input to the chip and brought the chip out of the power down mode.

The Currently Preferred Embodiment

FIG. 3 depicts the currently preferred embodiment of the present invention in a controller that provides an interface between a digital computer and a magnetic disk recorder or other memory means. Referring to FIG. 3, the magnetic disk controller for the present invention, shown as controller 302, interfaces between a digital computer 305 and disk drive 306. The digital computer 305 is coupled to controller 302 through data bus 303, address bus 304 and control bus 308. The controller 302 is coupled to driver 306 through a plurality of control, data and address lines 307.

FIG. 4 is an overall block diagram of the floppy disk controller (FDC) 400 for the present invention. Generally, FDC 400 comprises bus interface logic 401, host interface registers 406–413, floppy disk drive (FDD)interface 402, serial data interface 403, microcode and control logic 404 and power down logic and clock generator 405. In the currently preferred embodiment, bus interface logic 401 provides an interface between FDC 400 an the digital computer by receiving a chip select $\overline{CS}$ signal, a read $\overline{RD}$ control signal, a write $\overline{WR}$ control signal, address bits A0–3 for selecting one of the registers 406–413 and a direct memory access (DMA) acknowledge $\overline{DACK}$ signal for qualifying the $\overline{RD}$ and $\overline{WR}$ signals during DMA cycles.

Data bus DB0-7 transfers data to and from host interface registers 406–413. The direction of data transfer between DB0-7 and registers 406–413 is indicated by arrowed bus sections. Digital input register (DIR) 413 contains the status of digital input operations. DIR 413 receives a read (RDDIR) signal from bus interface logic 401 and FDD interface pin status from FDD interface 402 an outputs data onto data bus DB0-7. Digital output register (DOR) 412 contains the drive select, motor enable bits (ME0–3), a reset bit, and a DMA gating bit. DOR 412 receives a read and write control signal from bus interface logic 401. The motor enable bits ME0–3 and drive selects are coupled between DOR 412 and FDD interface 402. Furthermore, a DOR reset signals is coupled between DOR 412 and power down logic 405. Status registers A (410) and B (411) are read-only and monitor the state of the interrupt and several disk interface pins. Both registers 410 and 411 output data only onto DB0-7 and receive read (RSRA and RSRB respectively) control signals from bus interface logic 401. Furthermore, register 410 and 411 receive the FDD interface pin status from FDD interface 402. FIFO 409 receives all command parameter and disk data transfers. FIFO 409 inputs and outputs data on DB0-7 in response to read and write signals (RD/WR FIFO) from bus interface logic 401. The RD/WR FIFO signals are also coupled to power down logic 405. FIFO 409 receives a reset signal from power down logic 405 and a read/write (R/W) control signal from microcode and control logic 404. FIFO 409 also transfers data on internal data bus 414.

The main status register (MSR) is a read-only register and is used for controlling command input and result output for all commands. MSR 408 outputs data on DB0-7 in response to a read control (RD MSR) signal from bus interface logic 401, which is also input into power down logic 405. MSR 408 gets a microcode read/write (MCODE R/W) from microcode and control logic 404 for MSR 408 to transfer data on internal data bus 414. The MSR status from MSR 408 is provided to power down logic 405.

Data rate select and configuration control register (DSR/CCR) 407 is a write-only register which is used for controlling the data rate and ensures the drive timings all not violated. DSR/CCR 407 receive data from DB0-7 in response to a write (W.DSR) control signal from bus interface logic 401. A DSR data signal is also provided to power down logic 405 from DSR/CCR 407. The tape drive register (TDR) 406 provides a tape drive control signal to serial data interface 403. TDR 406 also accesses DB0-7 in response to read and write (R/W) control signals from bus interface logic 401.

FDD interface 402 provides the interface between FDC 400 and the floppy disk drive. FDD interface 402 receives the motor enables and drive selects from DOR 412, control signals from microcode and control logic 404 and the power down state signal (PD_STATE) from power down logic 405. FDD interface 402 has accesses to internal data bus 414. FDD interface provides the motor enables (ME0–3), the drive selects (DS0–3), the direction (DIR) control signal for controlling direction of head movement, the step pulses (STEP), the head select control signal (HDSEL), a mode signal (MFM) also used to program operational mode at reset, a density select (DENSEL) control signal and a write enable (WE) control signal to the floppy disk drive. The operation of these signals is known in the art. FDD interface receives track control line (TRK0) signal indicating the head is at track 0, the write protect (WP) signal indicating if the drive is write protected, a disk change (DSKCHG) control signal, an inverting (INVERT) signal and an index (INDEX) signal indicating the start of a track from the floppy disk drive. The operation of these signals is known in the art.

Serial data interface 403 provides a serial data interface between FDC 400 and the floppy disk drive. Serial data interface 403 can access internal data bus 414 and receives control signals from microcode and control logic 404 and the PD_STATE signal from power down logic 405. Serial data interface 403 drives serial data to the drive (WRDATA) and reads serial data from the disk (RDDATA). Serial data interface 403 also receives a mode select signal PLL0 that controls the PLL response characteristics.

Microcode and control logic 404 is responsible for controlling the operations of FDC 400 to ensure its function is carried out. Control logic 404 generate signals to FDD interface logic 402, serial data interface 403, power down logic 405 (as MCODE CNTRL), and FIFO 409. Control logic 404 receives the FDD interface pin status from FDD interface 402 and the PD_S-TATE signal from power down logic 405. Control logic accesses internal data bus 414 and receives from external sources the terminal count (TC) signal for terminating the current disk transfer and an identity (IDENT) signal for selecting the interface mode. Also control logic 404 generates an interrupt signal (INT) to power down logic 405 and for external use, along with a DMA request (DRQ) signal.

Besides those connections mentioned above, power down logic 405 access internal data bus 41 4, receives reset signal (RESET) and clock connections X1 and X2 and outputs IDLE and PD signals.

FDC 400 is divided into two general areas. First, bus interface logic 401 and registers 406–413 form one part. All this logic is static logic, such that no clocks are involved and no power is drawn if no accesses are made to these registers. For this reason, in the currently preferred embodiment, these blocks need not be powered down and are always ready to be accessed even in the power down state. The remainder of the logic is clocked (i.e., dynamic). However, the remaining logic can be either dynamic or static and is design choice. It should be noted that even static logic draws power when clocked since the power in CMOS is generated by capacitive displacement currents. It is this current that needs to be shut off during the power down mode.

Power down logic 405 achieves software transparency by powering down FDC 400 when it is not executing, or waiting on execution of any command. Thus, power down logic 405 puts FDC 400 in power down mode when it is in the idle state. In the currently preferred embodiment, FDC 400 is in the idle state when it is waiting for a command, no interrupt activity exists, the head head timer is at zero, and no motor on any drive is on. When power down logic 405 puts FDC 400 into the power down mode, FDC 400 looks to the software and the system as though it were powered up. FDC 400 is capable of accepting input into any register and all system interface registers can still be read. Only accesses to specific registers or turning on any motor enable bit, wakes up the chip. Furthermore, when power down logic 405 puts FDC 400 into power down mode, no status is lost or becomes changed (absent a purposeful change instituted during power down). This allows FDC 400 to resume where it left off before it entered the power down state.

It should be noted that in the preferred embodiment, of the eight system interface registers 406–413, only FIFO 409 and MSR 408 have their access controls connected to power down logic 405. These are the only two registers whose access wakes up the chip from the power down state. Other registers have various portions of their bit contents connected to power down logic 405 and certain combinations can affect power down logic 405, as will be seen later.

FIG. 5 displays the power down logic block shown, in FIG. 4. Power down logic 500 comprises REG_ACCESS 501, IDLE logic 502, auto power down logic 503, auto wake up logic 504, power down minimum timer 505, PD control logic 506, PD mode latch 507 and clock generator and oscillator 509. The individual connections and signals of each of these blocks will be discussed later in conjunction with the individual logic associated with each of the blocks.

Power down logic 500 powers down the FDC by shutting off the internal clocks (as generated by clock generator 509) and applying the power down state (PD_STATE) signal to the circuits. In the currently preferred embodiment, this includes the microcode and control logic and the serial data interface. The analog PLL, certain PLAs and sense circuits are also handled in this manner. Clock generator 509 is designed to cycle to a designated state and then stay in that state when the PD_STATE signal is active and then resume when it is removed.

Clock generator receives the X1 and X2 clocking signals and the data rate bits of the DSR and generates the internal clocks for the FDC. The crystal oscillator, which is a part of the clock generator circuit 509, is given a signal of its own (i.e., a control bit) to control whether the oscillator is active or not, independent of the PD_STATE signal. In the currently preferred embodiment, this bit is bit 5 of the DSR. The separate control bit allows the user to choose whether to leave the oscillator on during power down mode or turning the oscillator off during power down mode. In the currently preferred embodiment, if the user decides to turn off the oscillator, the user is forced to provide an external oscillator to clock the system upon powering up. If the user is providing an external oscillator anyway, then the FDC 400 saves the power consumption of the oscillator by turning it off always. If the user has a crystal attached, then power down logic 500 permits the oscillator to run during power down for instant recovery (i.e., transparency).

REG_ACCESS logic 501 receives the motor enable signals (i.e., bits), the read and write (RD/WR) FIFO signals and the read (RD) MSR signals. In response to these signals, REG_ACCESS logic 501 determines whether one of the motors on the drives of the floppy disk are enabled, whether the FIFO is currently being accessed by a read or a write operation, and whether the MSR command register is being read. Logic 501 outputs a signal (REG_ACCESS) to auto power down logic 503, which, in response to the signal, determines whether to put the FDC in power down. Logic 501 also outputs the signal to auto wake up logic 504.

IDLE logic 502 receives the command status (MSR 0-7) signals, the INT_PENDING signal indicating that an interrupt is pending, and the HEAD_LOADED timer signal indicating that the head load timer has timed out. In response to these inputs, IDLE logic 502 outputs a signal (IDLE) to the auto power down logic 503 and auto wake up logic 504.

The PD control logic 506 is responsible for placing the FDC in the power down mode. The auto power down logic 503 and wake up logic 504 signal to the power down logic 506 to set and reset respectively the flip-flop that produces the PD_STATE signal, thereby causing the chip to be put into or taken out of the power down mode respectively. In the currently preferred embodiment, this flip-flop is also set by the PD bit of the DSR (bit 6) and reset by any of the reset signals. Auto wake up logic 504 also outputs an AUTO_PD STATUS signal on the internal databus 508.

The power down minimum timer 505 receives the timer delay select from PD mode latch 507, the internal microcode timer output, and the PD_STATE signal from PD control logic 506 and generates a signal (PD MIN TIMER DONE) indicating that the timer has expired. This signal is output to both the PD control logic 506 and the auto power down logic 503.

PD mode latch 507 is loaded with the power down mode by the microcode and control logic. As will be shown below, the present invention supports both automatic and direct power down modes. In response to latching the power down mode, PD mode latch generates a power down mode enable (PD MODE ENABLE) signal to auto power down logic 503, a timer delay select signal to timer 505 and FDD tri-state disable pin to enable the FDD pins.

Power Down Modes

In the currently preferred embodiment, the power management logic supports two power down modes: direct power down and automatic power down. Direct power down occurs when programming action directly results in the powering down the chip with little or no delay or dependence on other factors (i.e., chip activity). Automatic power down results when power management logic monitors the FDC for certain conditions and according to a previously programmed mode.

As soon as the auto power down mode is enabled, a programmed minimum delay timer (see FIG. 11) begins counting. If the motor enables are not active after the predetermined time has been reached by the timer and the FDC is idle, then the power management logic powers down the FDC. If any motor enable is active or the chip is not idle when the minimum delay timer expires, the FDC waits until all motor enables are inactive and the FDC is idle before entering power down. Disabling the auto power down mode cancels the timers and holds the chip out of the automatic power down state. Reprogramming the data rate also restarts the timers to insure the full delay is seen. In the currently preferred embodiment, programming the DSR power down bit overrides the auto power down modes and its minimum delay. This is discussed in more detail in conjunction with FIG. 10.

FIGS. 5, 6A and 6B shows the ACCESS_REGISTER and IDLE logic, respectively, necessary to sense the state of the chip for going into automatic power down and coming out of the automatic power down state (i.e., auto wake up). In FIG. 6A, the ACCESS_REGISTER logic detects whether there is an access to the FIFO or a read from the MSR. These accesses wake up the FDC. The ACCESS_REGISTER logic comprises OR gate 601 and 602. OR gate 602 receives the motor enable bits noted as ME0-3 and generates motor enable access (ME_ACT) signal. This signal is one of the inputs to OR gate 601. OR gate 601 also receives the read and write FIFO signals and the read MSR signal. In response to these signals, OR gate 601 generates the ACCESS_REG signal.

The ACCESS_REGISTER and IDLE logic determine whether a register access exists that will wake up the FDC. If there is a read or write to the FIFO of the FDC, indicated by the RD_FIFO and WR_FIFO signals being high, then the register access (ACCESS_REG) signal output from OR gate 601 will be logically high, indicating the FIFO access. Similarly, if the MSR command register is being read, indicated by the RD_MSR being high, then the ACCESS_REG signal output from OR gate 601 will also be logically high, indicating that the MSR register is being read. In the currently preferred embodiment, these are the only two registers by which their access causes the chip to wake up. Accesses to all other registers do not wake up the FDC. However, certain bit settings in other registers do wake up the chip. In these cases, the bits are monitored directly, rather than monitoring the entire register access. An example of this type of monitoring is shown in FIG. 6A where the motor enable bits (ME0-3) are all coupled to inputs of OR gate 602. In the currently preferred embodiment, if any one of the motor enable bits is a logical 1, indicating that a drive motor for the floppy disk is enabled, then the motor enable active (ME_ACT) signal is high and input into OR gate 601. In response to the high input, OR gate 601 outputs the ACCESS_REG signal as high. Direct monitoring of other such bits is accomplished in the same manner. Other such bits being monitored include the DSR bit 6 (Manual Powerdown) DSR bit 7 (DSR_RESET) and DOR bit 2 (DOR_RESET). The ACCESS_REG signal is input into the automatic power down logic and the auto wake up logic. When the ACCESS_REG signal is high, the automatic power down logic does not put the FDC into power down. Also, if the FDC is in the power down mode, the ACCESS_REG signal being high causes the auto wake up logic to power up the FDC.

FIG. 6B depicts the currently preferred embodiment of the logic necessary to generate the IDLE signal. The IDLE signal generation logic consists of AND gate 603, AND gate 604 and buffer 605, coupled to the IDLE pin 606. The inputs to the AND gate 603 are the MSR bits 0-7. The output of AND gate 603 is the MSR_IDLE signal and is one input to AND gate 604. The other two inputs of AND gate 604 are the INTERRUPT_PENDING signal and the HEAD_LOADED signal and are both inverted inputs (the signals must be a logical zero for AND gate 604 to output a logical one). The output of AND gate 604 is the IDLE signal. The output of AND gate 604 is also the input to buffer 605. The output of buffer 605 is coupled to the IDLE pin 606.

The IDLE signal is output from AND gate 604. In the currently preferred embodiment, the IDLE goes high in response to the MSR_IDLE input of AND gate 604 being high and both INTERRUPT_PENDING and HEAD_LOADED inputs of AND gate 604 being low. The INTERRUPT_PENDING signal goes high when the FDC has an interrupt pending. Once the interrupt has been handled, the INTERRUPT_PENDING signal goes low. The HEAD_LOADED signal is high while the FDC is accessing the disk and remains high for a time afterward, wherein the time is set by a programmable delay. The IDLE signal output from AND gate 604 can go high only if the timer keyed to the loading of the head of the disk drive has expired (i.e., timed out) and the HEAD_LOADED signal is low. Also, the IDLE signal can go high only if the IDLE signal of the MSR (MSR_IDLE) goes high. The MSR_IDLE signal goes high when the 0-6 bits of the MSR are all low (i.e., logical 0) and the 7 bit of the MSR is high (i.e., a logical 1). It should be noted that if the FDC is in manual (i.e., direct) power down mode via bit 6 in the DSR, then the RQM bit is zero (MSR bit 7). This prevents the FDC from being in the automatic power down state, because MSR_IDLE is low forcing the IDLE signal from AND gate 604 to be low.

Thus, the idle state is defined as when there are no pending interrupts or command action (command busy and drives not busy) and the head timer has timed out. In the currently preferred embodiment, the idle state occurs when the IDLE signal is high. When the IDLE signal is low, the automatic power down logic does not put the FDC into power down. Also, if the FDC is in the power down mode, the IDLE signal being low causes the auto wake up logic to power up the FDC. Referring again to FIG. 6B, it should be noted that the IDLE signal is also taken, via buffer 605, to IDLE pin 606, for external use as a conditional signal for external powering down or suspending logic.

The auto power down control logic 700 is shown in FIG. 7. The control logic 700 consists of OR gates 701, 702 and 705, AND gate 703, R/S flip flops 704 and 706, the buffer 707, and PD pin 708. Referring to control logic 700, DOR_RESET, DSR_RESET, and PIN_RESET are coupled to the inputs of OR gate 701. The output of OR gate 701, the ALL_RESET signal, is output to the general reset logic and is coupled to one of the inputs of OR gate 702. The other inputs to OR gate 702 are the IDLE signal, the ACCESS_REG signal and the PD_STATE signal. The IDLE signal, however, is inverted at its input of OR gate 702. The PD_STATE signal is also an input to buffer 707. The output of buffer 707 is coupled to PD_PIN 708. OR gate 705 receives the PD MODE ENABLE signal and the ALL_RESET signal on its inputs. The PD MODE ENABLE signal is inverted. The output of OR gate 705 is coupled to the R input of flip-flop 706. The Z output of flip-flop 706 is the PD CNTR DONE signal and is coupled to the input of AND gate 703. The other inputs of AND gate 703 are coupled to the output of OR gate 702 and the MAN_PD (DSR bit 6) signals. Both of these signals are inverted inputs into AND gate 703. The output of OR gate 702 is also coupled to the R input of flip-flop 704. The Z output of flip-flop 704 is the auto power down signal AUTO PD and is coupled to the power down logic (FIG. 5).

Referring to FIG. 7, control logic 700 generates a signal to the power control logic (FIG. 5) causing it to put the FDC chip into power down mode when the Z output of flip-flop 704 goes high, even momentarily. The inputs of OR gate 702 dictate the conditions which prevent the chip from entering the power down state: ALL_RESET being high, IDLE being low, ACCESS_REG being high or PD_STATE being high. If any of these conditions are true, then the output of OR gate 702 is high and flip-flop 704 is reset through its R input. (The R and S inputs are only enabled when the E input to flip-flop 704 is high. If the E input is low, then the R and S inputs are ignored. In the preferred embodiment, flip-flop 704 is enabled to change state only when the internal clock PHI1 is high.) The absence of all the above conditions being true holds the R input on flip-flop 704 low and enables AND gate 703 to go high once its other inputs are also true. If the output of OR gate 702 is high, then it forces the output of AND gate 703 to be low which holds the S input to flip-flop 704 to a logical low, thereby preventing the chip from entering the power down state.

If there is a programmed reset from the DOR or DSR (i.e., DOR_RESET or DSR_RESET respectively) or the reset pin is put high, indicating that the FDC chip is to be reset, then OR gate 701 generates an ALL_RESET signal which is logically high. The ALL_RESET signal being high causes the output of OR gate 702 to be high, resetting flip-flop 704 through its R input (when PHI1 goes high). It should be noted that the ALL_RESET signal goes to reset the FDC chip as well.

If the IDLE signal is low or the ACCESS_REG signal is high, the output of OR gate 702 will be high and, as described above, the AUTO_PD signal will be held low, preventing the chip from entering the power down state.

If the output of OR gate 702 is low, then the output of AND gate 703 is enabled to go high which can put the chip into the power down state. There are two other inputs to AND gate 703 which must be in the correct state for this to occur. First, the MAN_PD signal from DSR bit 6 must be low. Manual power down, programmed through the DSR register, overrides the auto power down mode. (As stated before, the IDLE signal will also be taken low in this case, forcing OR gate 702 output to a one and resetting the auto power down flip-flop 704.) Also, the power down counter done, PD_CNTR_DONE, signal must be a logical one to enable setting the auto power down mode. The PD_CNTR_DONE signal comes from the Z output of flip-flop 706.

In the currently preferred embodiment, if the power down timer is done (i.e., has timed out) as indicated by the PD MIN TIMER DONE signal on the S input of flip-flop 706 and the output of OR gate 705 is a logical zero (i.e., low), then the Z output of flip-flop 706 is high, causing AND gate 703 to be high (assuming the other inputs to AND gate 703 are low). This causes flip-flop 703 to output the AUTO_PD signal, thereby placing the FDC chip into power down. The output of OR gate 705 is low when there is no reset, which is indicated by the ALL_RESET signal being low, and the automatic power down mode is enabled, as indicated by the PD MODE ENABLE signal being high. The PD MODE ENABLE signal is inverted on the input to OR gate 705.

It should be noted that the order of the arrival time of the inputs on AND gate 703 is not important. The output of OR gate 702 could be a steady logic low when the PD_CNTR_DONE signal goes high, causing the chip to enter the power down state at that event. Conversely, the PD_CNTR_DONE signal could long be a high, and it is the IDLE signal that comes high that sets the auto power down. In the current embodiment, once the AUTO_PD signal is set high, the existing logic sets the PD_STATE signal high as soon as PHI2 goes active. The PHI1 and PHI2 signals are the main, non-overlapping, clock signals for the whole chip. Now that PD_STATE is set high, it causes the output of OR gate 702 to go high, resetting flip-flop 704, and causing the AUTO_PD signal to return low. AUTO_PD is high for only one PHI1 time period, but that is sufficient to put the chip into the power down state.

Thus, control logic 700 determines when to put the FDC into the automatic power down state. In the currently preferred embodiment, automatic power down is only entered if the FDC is idle, no reset of any kind is present, if no register access is occurring (or motor enable active), the FDC is not currently in the power down state, the FDC is not programmed for manual power down (i.e., DSR bit 6 being set), and the PD minimum power down timer has expired. Once all these conditions are met, control logic 700 generates a signal which puts the FDC chip in the power down state.

The PD_STATE status is also provided on a pin called PD for external logic use. PD pin is active for either auto or manual power down modes. In the currently preferred embodiment, the logical state of the IDLE pin distinguishes the two modes. If the IDLE pin is a logical 0, then the FDC chip is in manual power down mode. If the IDLE pin is a logical 1, then the FDC chip is in automatic power down mode.

The power down control logic utilized to actually place the FDC into the power down state is the same as is used by assignee's 82077AA as referred to in the Background of the Invention section. The power down control logic comprises a flip-flop, in which the flip-flop output is the PD_STATE signal. This flip-flop is reset by any form of reset (i.e., the ALL_RESET shown in FIG. 7). It is also set by setting the MAN_PD bit in the DSR (FIG. 10). When the chip is put into the power down mode, the core of the FDC is first reset for a few clock cycles to put the chip in a known, quiescent state and then the clocks (PHI1 and PHI2) are stopped in a state that holds the chip frozen in that state and also at a state of reduced power consumption. When the power down state is exited by a reset, the clocks are restarted during the reset and normal operation resumed from the reset condition.

In the currently preferred embodiment, another set and reset input is added to the PD_STATE flip-flop (AUTO_PD and AUTO_WAKE, respectively). These set and reset the PD_STATE as before. A reset to the core does not affect the IDLE condition. Also the microcode does not change the important chip status that is stored in non-resettable registers. The microcode uses a status bit provided by the auto power down logic (discussed in conjunction with FIG. 8) to make this determination. Finally, the crystal oscillator power down is made independent of the rest of the chip's power down state. This will also be discussed more in a later section.

The Power Down Mode Command

In the currently preferred embodiment, to enter into automatic power down mode, a command is sent to the microcode and control logic of the FDC. This command sets the exact mode for automatic power down. The form of the command is shown in FIG. 8. Referring to FIG. 8, in the currently preferred embodiment, when writing the command to the FDC chip, if the AUTO_PD bit location is set to a 0, then the automatic power down mode is disabled. If the AUTO_PD bit location is set to a 1, then automatic power down mode is enabled. Furthermore, if the MIN DLY bit location is set to a zero and the AUTO_PD bit is set to a 1, then the minimum power up time is 10 ms. If, however, the MIN DLY bit is set to a 1 and the AUTO_PD bit is set to a 1, then the minimum power up time is 0.5 seconds. The third bit in the power down mode command is the FDD Tri-State Disable bit. This bit is ignored if the AUTO_PD enable bit is a zero. If the auto PD bit is a one and the Tri-State Disable bit is a zero, then the outputs that connects to the floppy disk drive (FDD) are put into a high impedance state when the chip goes into the power down state. This prevents any current from being drawn from the chip's output pins if the FDD's power is removed. If the AUTO_PD enable bit is a 1 and the Tri-State Disable bit is a 1, then the FDD interface outputs remain enabled and drive the FDD during power down.

The Results Phase is entered after the power down mode command. The Results Phase returns the values of the MIN DLY, AUTO_PD and Tri-State Enable bit locations. In the currently preferred embodiment, the two most significant bits of the Results Phase are set to 0 to distinguish it from the command of the same value in prior versions of this chip which returns an illegal command status of 80 hex.

In the currently preferred embodiment, the auto power down mode is initialized to the "disabled" state by a hardware reset. In the currently preferred embodiment, software resets have no effect on power down mode command parameters. It is necessary that the power down mode is not affected by software resets to maintain transparency to application software since such software often issue software resets.

Crystal Oscillator Power Management

The present invention allows the internal oscillator 402 to be programmed to be either powered down or active, independent of the power state of the FDC chip. In the current preferred embodiment, the programming of whether the oscillator is on or off is accomplished through the DSR "PDOSC" bit (bit 5). The currently preferred embodiment of the data rate select register (DSR) is shown in FIG. 9.

In the currently preferred embodiment, when the PDOSC bit is a 0 (default), the oscillator is powered up during the power down state. When this bit is programmed to a 1, the oscillator is turned off during power down. Hardware resets clear this bit to a 0. Software resets have no effect on this bit.

The PDOSC bit has sole control over the oscillator power. The DSR and auto power down modes have no effect on the oscillator power. If the FDC chip is used with the internal crystal oscillator, it is customary for the PDOSC bit to be left in its default state of a zero (oscillator powered on) at all times. This allows the oscillator to remain running even during the power down states and makes the chip recovery from power down fast and transparent. The external system software can turn the crystal oscillator off, if the power savings is desired, but then the software must control the resumption of power as well. This control is difficult to make transparent to the application software. In any case, when the internal crystal oscillator is used, it is recommended that the PDOSC bit be set only during the power down mode (PD pin is high), when the chip does not require a clock input. If an external oscillator source is used, the PDOSC bit can be left set at all times to save the oscillator power, about 2 mA.

Setting the PDOSC bit also has no effect on the clock input to the FDC chip (i.e., the X1 pin). The clock input is separately disabled when the FDC chip is powered down. This separation of control allows the oscillator to be off when an external source is used or allows the oscillator to be running when the rest of the chip is powered down. In the prior art, the state of the oscillator always coincided with whether the chip is powered down.

The Power Down State

In the auto power down mode, the power management logic maintains transparency to the software by not resetting the RQM bit (bit 7) in the MSR. Because the external system of the currently preferred embodiment checks the status of the RQM bit before sending commands, the FDC chip looks ready to receive the next command.

Registers

For the purposes of defining the power down state, registers are divided into two classes: those that wake the chip up when they are accessed and those that do not wake up the chip when they are accessed. Table 1 below shows the registers that can be accessed and not wake up the FDC in the currently preferred embodiment. The registers not listed do wake up the FDC chip when accessed.

TABLE 1

| Address | AT Registers | PS/2 Registers |
|---|---|---|
| 0 | — | STA R/O |
| 1 | — | STB R/O |

TABLE 1-continued

| Address | AT Registers | PS/2 Registers |
|---|---|---|
| 2 | DOR R/W | DOR R/W |
| 3 | TDR R/W | TDR R/W |
| 4 | DSR W/O | DSR W/O |
| 6 | — | — |
| 7 | DIR R/O | DIR R/O |
| 7 | CCR W/O | CCR W/O |

It should be noted that writing to the DOR does not wake up the FDC chip by itself. However, in the currently preferred embodiment, writing any motor enable bits active (high) or writing the DOR reset bit active (low) wakes up the FDC. Also, it should be noted that writing to the DSR does not wake up the chip unless the DSR reset bit is set.

Accesses to the above registers, with the stated of exceptions, can be accomplished at any time during power down without changing the state of the chip. This is due to the fact that these registers are static in nature and, thus, do not change when powered down. The status read from the chip reflects the true status as much as is possible in light of the fact that some bits reflect the value at an input pin whose input buffer is disabled during power down as discussed later. The values read are consistent with an inactive interface. Data written to the chip is retained and reflected in this operation when the chip wakes up. Accesses to the registers does require some additional power consumption during the actual access (in comparison to power down power consumption), but the FDC quickly returns to its low power consumption state after the access is completed.

Pins on the FDC Chip

In the preferred embodiment, the pins of the FDC are divided into two mains categories: system interface and floppy disk drive (FDD) interface pins. The FDD pins are disabled during power down, such that no power is drawn through the FDD as a result of any voltage level applied to the pin within the FDC's power supply range. Most of the system interface pins, however, are left active to monitor system accesses that may wake up the chip.

Table 2 below depicts the state of the system interface pins for currently preferred embodiment of the present invention during the power down state. The system interface pins which are unaffected by the power down mode are labeled "UC". Input pins are disabled to prevent internal currents from being generated when they have indeterminate input values.

TABLE 2

| Input Pins | State | Output Pins | State |
|---|---|---|---|
| CS# | UC | DRQ | UC (LOW) |
| RD# | UC | INT | UC (LOW) |
| WR# | UC | PD | UC (HIGH) |
| A<0:2> | UC | IDLE | UC |
| DB<0:7> | UC | DB<0:7> | UC |
| RESET | UC | | |
| IDENT | UC | | |
| DACK# | DISABLED | | |
| TC | DISABLED | | |
| X<1:2> | PROGRAMMABLE | | |

All pins in the FDD interface which are connected directly to the FDD itself are either disabled or tri-stated. Those listed as TRI-STATED can be left enabled by programming the TRI-STATE DISABLE bit in the Power Down Mode command to a one. Outputs are "tri-stated" to prevent current from flowing if the power to the FDD is cut off. Input pins are disabled to prevent internal currents from being generated when they have indeterminate input values. Pins used for local logic control or chip programming remain unaffected. Table 3 below shows the FDD interface pins and their current status during the power down mode.

TABLE 3

| Input Pins | State | Output Pins | State |
|---|---|---|---|
| RDDATA | DISABLED | ME<0:3> | TRISTATED* |
| WP | DISABLED | DS<0:3> | TRISTATED* |
| TRK0 | DISABLED | DIR | TRISTATED* |
| INDX | DISABLED | STEP | TRISTATED* |
| DRV2 | DISABLED | WRDATA | TRISTATED* |
| DSKCHG | DISABLED | WE | TRISTATED* |
| INVERT# | UC | HDSEL | TRISTATED* |
| PLL1 | UC | DENSEL | TRISTATED* |
| | | DRATE<0:1> | TRISTATED* |
| | | MFM | UC |

*TRISTATED unless TRISTATE DISABLE bit is a one.

The FDC 400 uses two power down status pins: IDLE and PD. The IDLE pin indicates when the chip is in the idle state and can be powered down. If the chip is powered down by the DSR MAN_PD bit, the IDLE pin is low in the power down state. If the chip is powered down by the automatic mode, the IDLE pin is high.

The PD (power down) pin is active when the chip is in the power down state. It is activated for either power down mode, automatic or manual. The PD pin can be used to power down any circuit peripherals to the FDC. In particular, if an external oscillator is utilized, the PD pin can be used to disable the output of the oscillator. It should be noted that the X1 pin need not be driven when the PD pin is high. This allows external oscillators to be disabled or put into a power saving mode without adversely affecting the chip.

Oscillator Behavior During Power Down

The currently preferred embodiment of the FDC of the present invention requires a 24 MHz clock to operate. The source of the clock can be external (i.e., through the X1 pin) or a crystal connected across the X1 and X2 pins. The external clock source is usually a canned crystal oscillator. The PD pin can be used to power down an external crystal oscillator for this purpose as described earlier.

If a crystal oscillator is used, the oscillator remains powered up while the remainder of the chip is powered down, allowing the FDC to wake up quickly and cleanly. The automatic power down mode does not affect the oscillator power down mode. If the user decides to power down the oscillator, the BIOS or other system software must intervene to power down and power up the oscillator. Although this saves power, it usually is difficult to make it transparent to the application software. However, having the PDOSC programming bit gives the external system software the option of how it wishes to deal with its power management versus software transparency.

While the FDC is in the power down state, its clock input is disabled. The disabling of the clock input prevents the clock input, X1, from having to be driven during power down. By disabling the clock input, any internal power dissipation due to X1 being driven by an external source, its own crystal oscillator or being left at an indeterminate input level is prevented.

Wake Up Modes

FIG. 10 depicts the automatic wake up logic 1000 for the present invention. Referring to FIG. 10, the automatic wake up logic 1000 comprises AND gates 1001, 1006, and 1007, OR gates 1002 and 1003, R/S flip-flop 1004 and buffer 1005. AND gate 1001 receives the AUTO_PD signal and the PHI2 signals on its inputs. The output of AND gate 1001 is coupled to the S input of flip-flop 1004. OR gate 1002 receives the ALL_RESET signal on its input in the MAN_PD signal on its other input. The output of OR gate 1002 is coupled to the R input of flip-flop 1004. The inputs of OR gate 1003 are the IDLE signal an the ACCESS_REG signal. The IDLE signal is inverted. The output of OR gate 1003, the Z output of flip-flop 1004, and the PD_STATE signal are the inputs to AND gate 1006. The output of AND gate 1006 is the automatic wake up signal which goes to the existing power down logic. The Z output of flip-flop 1004 is also coupled to buffer 1005. Buffer 1005 receives a microcode register read signal which controls the output of the automatic power down status to the internal data bus. The Z output of flip-flop 1004 is also coupled to one of the inputs of AND gate 1007. The other input of AND gate 1007 is coupled to the reset signal. The Z output of 1004 is inverted at the input of AND gate 1007. The output of AND gate 1007 is coupled to the FIFO_RESET signal.

If the chip enters the power down state through the automatic mode, then the chip can be awakened by reset or by appropriate access to certain registers. If reset is used (hardware or software), the microcode goes through an almost a regular reset sequence. The disk status is initialized. The FIFO mode is set to default mode on a hardware reset or on a software reset if the LOCK command has not blocked it. Finally, after a delay, the interrupt is issued. If the access is through the selected registers, then the FDC resumes operation as though it were never powered down.

Wake up control logic 1000 utilizes flip-flop 1004 to store the fact that the chip went into the automatic power down state. The Z output of flip-flop 1004 is the AUTO_PD STATUS signal indicating that the FDC chip is in the automatic power down state. The Z output of flip-flop 1004 is set when the AUTO_PD signal is set, indicating the chip is entering automatic power down, and the PHI2 clock is high. The state of AUTO_PD is sampled at this time and held until reset, even though the AUTO_PD signal goes low when PD_STATE goes active during the power down state. AUTO_PD and PHI2 signals cause AND gate 1001 to output a logical 1 to the S input of flip-flop 1004. This causes flip-flop 1004 to output a logical 1 for the AUTO_PD STATUS bit. This status bit can be read later by the microcode through buffer 1005 once enabled by the microcode register read signal. This is done to allow the chip to make decisions about what internal status to update and what status is to remain. The AUTO_PD STATUS bit is also coupled to one input of AND gate 1006, such that when this bit is high during the PD_STATE, and a wake up condition of either IDLE being low or ACCESS_REG being high (OR gate 1003 output is high), then the auto wake up signal is enabled and output. The AUTO_PD STATUS bit is also coupled to an inverted input of AND gate 1007, such that if the bit is low (not AUTO_PD) and assuming there is a reset (i.e., the other input to AND gate 1007), a signal is generated to reset the FIFO. If the chip is in the automatic power down state, the FIFO is not reset (i.e., FIFO_RESET is held inactive). This allows the FIFO to be accessed in its normal manner during the automatic power down state. It also allows the RQM bit to remain active, so that the external application software remains unaware that the chip is in the power down state (i.e., software transparency).

The AUTO_PD STATUS bit can be made low by any form of reset or the chip being in the manual power down mode. If either of these are the case, OR gate 1002 generates a logical 1 on the R input of flip-flop 1004, causing flip-flop 1004 to make the bit a logical 0 (i.e., low).

Thus, wake up logic 1000 action is very simple. If the chip is in the automatic power down state, the AUTO_PD STATUS signal is high (i.e., a logical 1). If the IDLE signal changes, the ACCESS_REG signal occurs, the motor enable bits are high (e.g., any one of them is activated) (ACCESS_REG=1), then a signal is sent to the power down logic (block 506 of FIG. 5) to wake up the chip.

If the IDLE signal is a logical low or the ACCESS_REG signal is high, then the output of OR gate 1003 is high. This allows the output to the auto wake up logic from AND gate 1006 to be high, as long as the AUTO_PD STATUS bit is high and the PD_STATE signal is high. The IDLE and ACCESS_REG signals will not wake the chip as long as one or more of the motor enables are not activated, an attempt is not made by the external system to read the contents of the MSR, or a read or write to the FIFO command register does not occur.

Once awake, in the currently preferred embodiment, the FDC remains powered up for a minimum of 10 ms or 0.5 seconds (depending on the MIN DLY bit). Only setting the DSR power down bit can override this minimum delay. The timing and logic for this is the power down mode latch and timer logic shown in FIG. 11.

Referring to FIG. 11, the latch and timer logic 1100 comprises latch 1101, AND gate 1102, tri-state buffers 1103, OR gate 1109, counters 1105–07, multiplexer (MUX) 1108, and is coupled to the FDD interface pins 1104. Latch 1101 is loaded by the internal microcode and control logic from data provided through the PD mode command. In the currently preferred embodiment, three bits are defined: a bit to enable the PD mode (i.e., it travels to the PD control logic), a bit to select whether the minimum power down time is 10 ms or 500 ms and a bit to enable or disable whether the floppy disk drive (FDD) interface pins are put into a high impedance state or not. Representative logic is given for the buffer output disable (or high impedance control). If the FDD interface pins are to be disabled, latch 1101 sets the FDD tri-state bit to a zero. Assuming the FDC is in power down mode, as indicated by the PD_STATE signal being high, the output of AND gate 1102 will be high. A high output of AND gate 1102 means that the input to tri-state buffers 1103 are disabled, thereby putting the FDD interface pins at a high impedance state.

Counter 1105 divides the internal clock (PHI1 and PHI2) by 4,095 and generates a time base that is on the order of 1 ms at a 500 Kbps data rate. However, this time base is proportional to the data rate, such that a programmable divider is placed after it (counter 1106) to provide a data rate independent delay of 10 ms. The modulo of counter 1106 is given in the table as shown in FIG. 11. The clock is further divided by 50 using counter 1107 to provide the second delay option of 0.5 seconds. Both counters are kept reset by the PD mode enable bit not being set, by being in the power down state or by any form of reset. The timer delay select bit from PD mode latch 1101 selects the programmed delay by asserting or deasserting the timer delay bit at the SEL input of MUX 1108. The resulting selection output from MUX 1108 is sent to the PD control logic.

In the currently preferred embodiment, OR gate 1109 resets counters 1106 and 1107 if there is a reset signal (RESET), the PD mode is disabled or the FDD tri-state signals are low.

Microcode Recovery

The microcode recovery method and recovery time is dependent on the manner in which the FDC is put into power down state and how it was awakened. Since the oscillator and the rest of the chip are powered down separately, the recovery time effects of the oscillator are ignored.

When the chip enters the power down state by the automatic power down mode, the MSR continues to contain 80 hex (RQM bit is set) indicating that the FDC is ready to receive a command. This is the key feature keeping the power down state transparent to the software.

Before a command can be written to the FDC, it is first necessary to read the MSR to be sure that the FDC is ready to receive the command. The chip detects the read, presumes that it foretells a command and starts the wake up process. While the chip wakes up, it does not change the state of the MSR (i.e., RQM remains a one), but is able to receive the command in the FIFO. If it receives a command while waking up, it remembers the command, it clears the RQM bit in the MSR to prevent further bytes from being written and it acts on the command when the microcode is fully awake.

If for some reason, the MSR if not polled before the command is written, the wake up proceeds as above with the RQM bit cleared and the command byte held until the microcode is ready. Although the FDC expects a command to be written into the FIFO (i.e., the DIR bit in the MSR is zero) at this time, a read from the FIFO will wake up the chip and cause the "illegal command" status to be returned, as it normally would. If a motor enable bit in the DOR is written active, then the chip begins its waking up sequence in the same fashion as if the MSR had been polled. The MSR status continues to show the chip is ready to receive a command, etc.

Although the microcode may take a while to get to the point where it can execute a command after waking up, this delay is not a problem. There is a "polling loop" in the microcode that regularly occurs when the chip is awake that can delay the execution of a command. This polling loop is a microcode loop which exists from the time that the the FDC polled all the drives at regular intervals for their status when the FDC is not executing a command. In the currently preferred embodiment, this polling loop is many tens of microseconds long. If a command is issued just after the microcode enters this loop, the command is held until the loop is finished. Then the command is decoded. The external software must be tolerant of this polling loop delay. This tolerance also applies to the microcode wake up time after an auto power down.

Crystal Oscillator Recovery

Because the crystal oscillator takes too long to start and does not have reliable recovery characteristics, the currently preferred embodiment of the FDC does not support automatic oscillator power management. The automatic power down mode does not affect the crystal oscillator. Crystal oscillator power management must be done by the system software.

If an external oscillator source is used, then the characteristic of internal crystal oscillator are not an issue. In this case, the oscillator can be powered down by the DSR to save the current. Recovery time of the FDC is dependent on the characteristics of the external source. If the external source remains active during the time the FDC chip is powered down, then the recovery time is minimized. The PD pin can be used to turn off the output of the external source to save power. The FDC chip does not need a clock source while the PD pin is active.

Once the PD pin goes low, the external clock should resume such that once oscillations begin they do not stop. Proper operation of the FDC cannot be guaranteed if the external source "drops out" for more than 1 $\mu$S after it resumes oscillation. It should be noted that the external source does not have to start oscillating immediately after the PD signal goes low. The external source only must continue oscillating once it starts.

Whereas many alterations and modifications of the present invention will no doubt become apparent to a person of ordinary skill in the art after having read the foregoing description, it is to be understood that the particular embodiment shown and described by way of illustration are in no way intended to be considered limiting. Therefore, reference to the details of the preferred embodiments are not intended to limit the scope of the claims which themselves recite only those features regarded as essential to the invention.

Thus, a method for a chip to monitor itself and enter and exit the power down state in a manner that is transparent to the software running on the chip has been described.

I claim:

1. A method for an integrated circuit chip in a computer system to control power consumption automatically, wherein said chip includes core logic and no-core logic to provide internal functionality for the chip and the necessary interface to allow the chip to interact within said computer system and the chip is clocked by a clock input, and further wherein said chip being operable in a plurality of states of operation, said method comprising the steps of:

internally monitoring the core of said chip, said step of internally monitoring being performed by said chip;

determining internally when the core of said chip is in an inactive state;

internally placing said chip in a reduced power consumption state in response to said step of determining indicating that the core of said chip is in said inactive state, said step of internally placing being performed by said chip, wherein the step of internally placing the core of said chip in a reduced power consumption state includes the step of disabling the clock input to the core of said chip;

generating an externally accessible status indication to said computer system when the core of said chip is in the reduced power consumption state, such that said chip appears to said computer system as being powered up, wherein the step of generating the externally accessible status indication includes the step of allowing accesses to the non-core logic while the core remains in the reduced power consumption state; and powering on said chip on an appropriate request for operation after said chip has been put into said reduced power consumption state, wherein the step of powering on the core of said chip includes the step of enabling the clock input to the core, such that said chip exits the reduced consumption state.

2. The method as defined in claim 1 further comprising the steps of internally determining whether said chip has entered one of said plurality of states of operation, and internally placing said chip back into said reduced power consumption state after a predetermined period of time has elapsed if said chip has not entered one of said plurality of states of operation.

3. The method as defined in claim 1 further comprising the step of putting said chip back into said reduced power consumption state after said chip has been powered up once a predetermined period of time has elapsed if said chip is in said inactive state.

4. The method as defined in claim 1 wherein said chip includes an internal oscillator further comprising the step of allowing said oscillator to run during said reduced power consumption state, such that the core of said chip is clocked instantaneously upon exiting said reduced power consumption state.

5. The method as defined in claim 1 wherein said step of powering on said chip also occurs in response to said chip being reset.

6. The method as defined in claim 1 further comprising the step of placing said chip in an automatic power down mode, such that said chip is placed in the reduced power consumption state automatically when said chip is in said inactive state.

7. The method as defined in claim 6 wherein said step of placing said chip in an automatic power down mode includes the step of sending at least one command to said chip.

8. A method of automatically powering down an integrated circuit chip from within the chip, wherein the chip has core and non-core logic and is clocked by a clock input, and further wherein said chip interacts within a computer system and is operable in a plurality of states of operation, said method comprising the steps of:

internally monitoring the core of said chip, said step of internally monitoring being performed by said chip;

internally placing said chip in the reduced power consumption state when said core logic is inactive; said step of internally placing being performed by said chip, wherein the step of internally placing the core of said chip in a reduced power consumption state includes the step of disabling the clock input to the core of said chip, such that said non-core logic can be accessed by said computer system without bringing said chip out of said reduced power consumption state;

setting a status indicator indicating that said chip is ready to receive inputs while in the reduced power consumption state:

monitoring a set of interface pins to determine if a command or interrupt is being sent to said chip; and powering on said chip when said core logic of said chip is requested by said computer system, wherein the step of powering on the core of said chip includes the step of reading the status indicator to determine if said chip is ready and the step of enabling the clock input to the core.

9. An integrated circuit chip for use in a computer system comprising:

core logic to perform a specific function:

non-core logic coupled to the core logic, wherein the non-core logic comprises a first logic circuit to store status of the integrated circuit:

a second logic circuit coupled to the core logic to internally monitoring said core logic;

a third logic circuit coupled to the second logic circuit to determine when the core logic of said chip is in an inactive state; and a fourth logic circuit coupled to the third logic circuit to place the said chip in a reduced power consumption state in response to said means for determining indicating that said chip is in said inactive state, wherein said fourth logic circuit comprises a clock disabling mechanism to disable the clock input to the core logic of said chip, and wherein said non-core logic is accessed by said computer system without bringing said core logic out of said reduced power consumption state and wherein said non-core logic stores an externally accessible indication when said chip is in the reduced power consumption state that indicates said chip is ready to receive inputs.

10. The integrated circuit chip defined in claim 9 further comprising a fifth logic circuit on said chip upon request for operation after said chip has been put into said reduced power consumption state, such that said chip exits the reduced power consumption state.

11. The integrated circuit defined in claim 9 wherein the non-core logic comprise at least one register, and further wherein said at least one register receives input from a source external to said chip when said chip is in the reduced power consumption state.

12. An integrated circuit chip for performing a designated function in a computer system comprising:

a bus;

a core logic coupled to said bus to perform said designated function;

a non-core logic coupled to said bus to store the status of said chip and to store input data received from the computer system, wherein the non-core logic comprises a plurality of registers and one of the plurality of registers accessible from a source external to said chip contains a status indicator indicative of the readiness of the chip to receive commands from the computer system;

a first logic circuit coupled to said core logic to internally monitor said core logic to determine when said core logic is inactive; and a second logic circuit coupled to said first logic circuit to place said core logic in a reduced power consumption state in response to said first logic circuit determining that said core logic is inactive, wherein the non-core logic receives input data and registers of said plurality of registers are accessible during the reduced power consumption state, and further wherein the status indicator indicates that the chip is ready to receive commands during the reduced power consumption state.

13. The chip defined in claim 12 further comprising a third logic circuit coupled to said core logic to power up said core logic to an active state, wherein said chip is powered on in response to a request for operation after said core logic has been placed in the reduced power consumption state, such that said core logic exits the reduced power consumption state.

14. The chip defined in claim 12 further comprising a plurality of pins to interface to the computer system, wherein a portion of the pins remain active while the chip is in the reduced power consumption state, such that system accesses to said chip are monitored while the chip is in the reduced power consumption state.

15. The chip defined in claim 12 further comprising a clock generation mechanism coupled to said core logic to provide clocking signals to said core logic, wherein said clock generation mechanism includes an oscillator, wherein said oscillator remains powered up while said core logic is in the reduced power consumption state.

16. The chip defined in claim 15 further comprising a clock disabling mechanism coupled to said clock generation means to turn off said oscillator when said core logic in said reduced power consumption state.

17. A computer system comprising a bus, a microprocessor coupled to said bus; a memory means coupled to said bus for storing data and instructions; an integrated circuit chip coupled to said bus, said chip including:
 a bus;
 a core logic coupled to said bus to perform said designated function;
 a non-core logic coupled to said bus to store the status of said chip and to store input data received from the computer system, wherein the non-core logic comprises a plurality of registers and one of the plurality of registers contains a status indicator indicative of the readiness of the chip to receive commands from the computer system;
 a first logic circuit coupled to said core logic to internally monitor said core logic to determine when said core logic is inactive; and
 a second logic circuit coupled to said first logic circuit to place said core logic in a reduced power consumption state in response to said first logic circuit determining that said core logic is inactive;
 a third logic circuit coupled to said core logic to power up said core logic to an active state, wherein said chip is powered on in response to a request for operation after said core logic has been placed in the reduced power consumption state, such that said core logic exits the reduced power consumption state,
wherein the non-core logic receives input data and registers of said plurality of registers are accessible during the reduced power consumption state, and further wherein the status indicator indicates that the chip is ready to receive commands during the reduced power consumption state, such that the chip enters and exits the reduced power consumption state transparently to software running in the computer system.

* * * * *

UNITED STATES PATENT AND TRADEMARK OFFICE
CERTIFICATE OF CORRECTION

PATENT NO. : 5,388,265

DATED : February 7, 1995

INVENTOR(S) : Andrew M. Volk

It is certified that error appears in the above-identified patent and that said Letters Patent is hereby corrected as shown below:

In column 9 at line 26 delete "head" and insert --load--

Signed and Sealed this

Twelfth Day of August, 1997

*Attest:*

BRUCE LEHMAN

*Attesting Officer*     *Commissioner of Patents and Trademarks*